(12) United States Patent
Sheikh-Bahaie

(10) Patent No.: US 6,805,000 B1
(45) Date of Patent: Oct. 19, 2004

(54) APPARATUS AND METHOD FOR MOUNTING A TIRE CONDITION SENSOR CAPSULE TO A WHEEL RIM

(75) Inventor: Kian Sheikh-Bahaie, Burnaby (CA)

(73) Assignee: Smartire Systems, Inc., Richmond (CA)

( * ) Notice: Subject to any disclaimer, the term of this patent is extended or adjusted under 35 U.S.C. 154(b) by 93 days.

(21) Appl. No.: 10/068,903

(22) Filed: Feb. 11, 2002

(51) Int. Cl.$^7$ .............................................. B62C 23/02
(52) U.S. Cl. .................... 73/146.8; 73/146; 73/146.5
(58) Field of Search .............................. 73/146–146.8, 73/14.2; 340/447

(56) References Cited

U.S. PATENT DOCUMENTS

| | | | |
|---|---|---|---|
| 3,178,686 A | 4/1965 | Mills | 340/58 |
| 3,723,966 A | 3/1973 | Mueller et al. | 340/58 |
| 3,810,090 A | 5/1974 | Davis, Jr. et al. | 340/58 |
| 3,873,965 A | 3/1975 | Garcia | 340/447 |
| 3,911,434 A | 10/1975 | Cook | 343/6.5 R |
| 4,048,614 A | 9/1977 | Shumway | 340/58 |
| 4,067,235 A | 1/1978 | Markland et al. | 73/146.5 |
| 4,074,227 A | 2/1978 | Kalmus | 340/58 |
| 4,117,452 A | 9/1978 | Snyder et al. | 340/58 |
| 4,119,944 A | 10/1978 | Smith | 340/58 |
| 4,137,520 A | 1/1979 | Deveau | 340/58 |
| 4,160,234 A | 7/1979 | Karbo et al. | 340/58 |
| 4,163,208 A | 7/1979 | Merz | 340/58 |
| 4,196,414 A | 4/1980 | Muller | 340/58 |
| 4,229,728 A | 10/1980 | Tremba | 340/58 |
| 4,235,184 A | 11/1980 | Schiavone | 116/34 R |
| 4,237,728 A | 12/1980 | Betts et al. | 73/146.5 |
| 4,246,567 A | 1/1981 | Miller | 340/58 |
| 4,300,118 A | 11/1981 | Matsuda et al. | 340/58 |
| 4,319,220 A | 3/1982 | Pappas et al. | 340/447 |
| 4,384,482 A | 5/1983 | Snyder | 73/146.5 |
| 4,429,232 A | 1/1984 | Thomas et al. | 290/1 R |
| 4,487,154 A | 12/1984 | Daly et al. | 116/34 B |
| 4,510,484 A | 4/1985 | Snyder | 340/58 |
| 4,531,112 A | 7/1985 | Thomas | 340/58 |
| 4,619,137 A | 10/1986 | Bott | 73/146.5 |
| 4,657,289 A | 4/1987 | Boyer | 290/1 R |
| 4,695,823 A | 9/1987 | Vernon | 340/447 |
| 4,717,905 A | 1/1988 | Morrison, Jr. et al. | 340/58 |
| 4,737,761 A | 4/1988 | Dosjoub et al. | 340/58 |
| 4,742,857 A | 5/1988 | Gandhi | 152/418 |
| 4,862,486 A | 8/1989 | Wing et al. | 377/16 |
| 4,970,491 A | 11/1990 | Saint et al. | 340/447 |
| 4,975,679 A | 12/1990 | Ballyns | 340/442 |
| 5,001,457 A | 3/1991 | Wang | 340/447 |
| 5,040,561 A | 8/1991 | Achterholt | 137/227 |
| 5,163,320 A | 11/1992 | Goshima et al. | 73/146.5 |
| 5,285,189 A | 2/1994 | Nowicki et al. | 340/447 |
| 5,559,484 A | 9/1996 | Nowicki et al. | 340/447 |
| 5,956,820 A | 9/1999 | Albinski | 24/455 |
| 6,549,152 B1 * | 4/2003 | Kling | 341/144 |
| 6,591,672 B2 * | 7/2003 | Chuang et al. | 73/146.8 |
| 2001/0030601 A1 | 10/2001 | Nigon et al. | 340/445 |

FOREIGN PATENT DOCUMENTS

| | | | |
|---|---|---|---|
| FR | 2 441 502 | 11/1978 | B60C/23/04 |
| FR | 2 661 373 A1 | 4/1990 | B60C/23/04 |

* cited by examiner

*Primary Examiner*—Edward Lefkowitz
*Assistant Examiner*—Alandra Ellington

(57) ABSTRACT

An apparatus for mounting a tire condition sensor capsule to a wheel rim comprises a housing having a receptacle having a shape complementary to the capsule to receive the capsule snugly therein, a lock on the housing, cooperating with a surface on the capsule to lock the housing to the capsule; and a connector for connecting the housing the wheel rim such that the capsule is between a portion of the wheel rim and the receptacle.

38 Claims, 7 Drawing Sheets

APPARATUS AND METHOD FOR MOUNTING A TIRE CONDITION SENSOR CAPSULE TO A WHEEL RIM

BACKGROUND OF THE INVENTION

1. Field of Invention

This invention relates to tire condition sensing and more particularly to an apparatus and method for mounting a tire condition sensor capsule to a wheel rim.

2. Description of Related Art

The use of tire condition sensors is becoming increasingly popular. Some countries are implementing requirements that certain vehicles employ such devices to improve safety. Various schemes have been developed for mounting tire condition sensors to vehicle wheels. Some mount sensors to the outside of the wheel while others mount them to the inside of the wheel (inside the tire). Mounting inside the tire is a preferable method.

Various tire condition sensors operable to be mounted inside the tire are available. These sensors may include pressure sensors, temperature sensors or the like and some include transmitter circuitry for transmitting a measured tire condition value to a remote transmitter. Each manufacturer of a tire condition sensor will package its device or devices in a package of its own design. In general, tire condition sensor units are available in a wide variety of shapes and sizes to accommodate the circuitry they employ. However, some packaging can be susceptible to damage, especially during tire installation. In general, sensor packages that have protruding objects or sharp corners can be susceptible to catching on a tire as the tire is installed.

In addition each wheel rim on which a tire condition sensor might be installed has its own special requirements in relation to permissible weight of the sensor, profile, and ease of installation. Typically, this has been dealt with by providing separately packaged condition sensors for each type of wheel rim.

With the risk of damage to the sensor during tire installation, or removal, if a sensor is damaged during either of these procedures, an entirely new sensor must be installed. Damage to the sensor usually involves damage to the mounting components such as tabs or other structure on the sensor unit itself, requiring replacement of the entire sensor, even if only the sensor case, for example is broken.

What would be desirable is a way of mounting tire condition sensors in a manner that protects the sensor unit while at the same time permitting easy and inexpensive installation and removal, without requiring a brand new sensor unit when only mounting components are damaged. The present invention addresses this need.

SUMMARY OF THE INVENTION

The present invention addresses the above needs by providing an apparatus and method for mounting a tire condition sensor capsule to a wheel rim.

In accordance with one aspect of the invention there is provided an apparatus for mounting a tire condition sensor capsule to a wheel rim. The apparatus may include a housing having a receptacle having a shape complementary to the capsule to receive the capsule snugly therein. Additionally the apparatus may include a lock on the housing, cooperating with a surface on the capsule to lock the housing to the capsule, and a connector for connecting the housing to the wheel rim such that the capsule is between a portion of the wheel rim and the receptacle.

The housing may include a wall and may be rigid and/or may be formed of injection molded plastic.

The lock may be on the wall of the housing. The wall may have first and second spaced apart side portions between which the capsule is received and the lock may be on one of the first and second side portions. The lock may include first and second clips on the first and second side portions, respectively.

The first and second side portions may have first and second edge extremities, respectively, and the lock may include first and second clips on the first and second edge extremities, respectively, which cooperate with the capsule to lock the housing to the capsule. The lock may further include third and fourth clips spaced apart from the first and second clips respectively, on the first and second edge extremities. The first and second edge extremities may have first and second contact surfaces respectively for contacting the wheel rim and the contact surfaces may have a concave shape complementary to the shape of the wheel rim.

The wall may have a weight reducing void therein and may have first and second spaced apart side portions between which the capsule is received and the wall may have an intermediate portion extending between the first and second side portions. The intermediate portion may have a weight reducing void therein and may have first and second spaced apart weight reducing voids therein.

The wall may include first and second opposite end portions extending from the intermediate portion, the capsule being received between the first and second side portions and the first and second opposite end portions. The first and second wall portions may be wider than the first and second opposite end portions such that the first and second end side portions completely cover respective side portions of the capsule and such that the first and second opposite end portions only partially cover respective end portions of the capsule.

The connector may include first and second fastener receivers on the first and second opposite end portions of the housing. The first and second fastener receivers may be molded into the housing, for example. Alternatively, the connector may include a valve stem connector operable to cooperate with a valve stem of the wheel to secure the housing to the wheel rim. The valve stem connector may include a valve stem receptacle in the housing for receiving a portion of the valve stem, and may further include an opening in the housing, in communication with the valve stem receptacle, for receiving a fastener operable to fasten the valve stem in the valve stem receptacle.

Alternatively, the connector may include a strap holder operable to cooperate with a strap that extends around the wheel to secure the housing to the wheel. The strap holder may be formed in the housing and may include first and second slots formed in the housing, the slots being operable to receive the strap. The wall may have first and second opposite end portions and the strap holder may include first and second openings in the first and second end portions respectively, for receiving the strap.

In accordance with another aspect of the invention there is provided a method for mounting a tire condition sensor capsule to a wheel rim. The method may include receiving the capsule in a housing having a receptacle having a shape complementary to the capsule, locking the capsule in the housing, and connecting the housing to the wheel rim such that the capsule is between a portion of the wheel rim and the receptacle.

Receiving may include receiving the capsule between first and second side portions and between first and second end portions of a wall of the housing.

Locking may include engaging a clip on the housing with a surface on the capsule.

Connecting the housing to the wheel rim may include fastening first and second end portions of the housing to corresponding mounting surfaces on the wheel rim. Connecting the housing to the wheel rim may alternatively include receiving a portion of a valve stem of the wheel rim in a receptacle in the housing and fastening the portion of a valve stem of the wheel rim in the receptacle in the housing.

Alternatively, connecting the housing to the wheel rim may involve engaging a strap extending around the wheel rim with openings in the housing.

In accordance with yet another aspect of the invention there is provided an apparatus for mounting a tire condition sensor capsule to a wheel rim. The apparatus may include a device for holding and protecting the capsule, a device for locking the capsule in the device for holding and protecting, and a device for connecting the device for holding and protecting to the wheel rim such that the capsule is between the device for holding and protecting and the wheel rim.

The device for holding and protecting may include a receptacle for receiving the capsule.

The device for locking may include a clip on the device for holding and protecting, the clip being operable to engage a surface of the capsule.

The device for connecting may include first and second fastener receivers on the device for holding and protecting.

Alternatively, the connecting device may include a valve stem connector operable to cooperate with a valve stem of the wheel to secure the device for holding and protecting to the wheel rim.

Alternatively, the connecting device may include a strap holder operable to cooperate with a strap that extends around the wheel to secure the device for holding and protecting to the wheel rim.

The device for holding and protecting may include a housing having a receptacle for receiving the capsule.

In accordance with another aspect of the invention there is provided a tire condition sensing system operable to be mounted to a wheel rim. The system may include a tire condition sensor capsule containing an electronic circuit for measuring a tire condition and for transmitting a signal indicative of the condition to a remote receiver. The system may further include a housing having a receptacle having a shape complementary to the capsule to receive the capsule snugly therein, a lock on the housing, cooperating with a cover of the capsule to lock the housing to the capsule, and a connector for connecting the housing to the wheel rim such that the capsule is between a portion of the wheel rim and the receptacle.

In accordance with yet another aspect of the invention there is provided a tire condition sensing system. The system may include a wheel rim, a tire condition sensor capsule containing an electronic circuit for measuring a tire condition and for transmitting a signal indicative of the condition to a remote receiver, a housing having a receptacle having a shape complementary to the capsule to receive the capsule snugly therein, a lock on the housing, cooperating with a cover of the capsule to lock the housing to the capsule, and a connector for connecting the housing to the wheel rim such that the capsule is between a portion of the wheel rim and the receptacle.

In accordance with another aspect of the invention there is provided a method of enabling measurement of a tire condition. The method may include installing on a vehicle a wheel to which is secured a housing having a receptacle in which a tire condition sensor capsule containing a tire condition sensor and signal transmitter is removably locked by a locking mechanism engaged with the capsule.

The present invention provides a versatile apparatus for mounting a tire condition sensor capsule to a wheel rim. As the capsule entirely encapsulates sensor and transmitter circuitry, the capsule may be treated as a separate, modular, replaceable unit. By using a housing to secure the tire condition sensor capsule to the wheel rim, expensive capsules can be replaced more easily without damage, enabling them to be removed, repaired and reinstalled if desired. An inventory of various inexpensive housings may be made available to provide for mounting the same type of capsules in various ways, such as the ways described herein. An inventory of a plurality of different capsule shapes, sizes and configurations need not be maintained.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
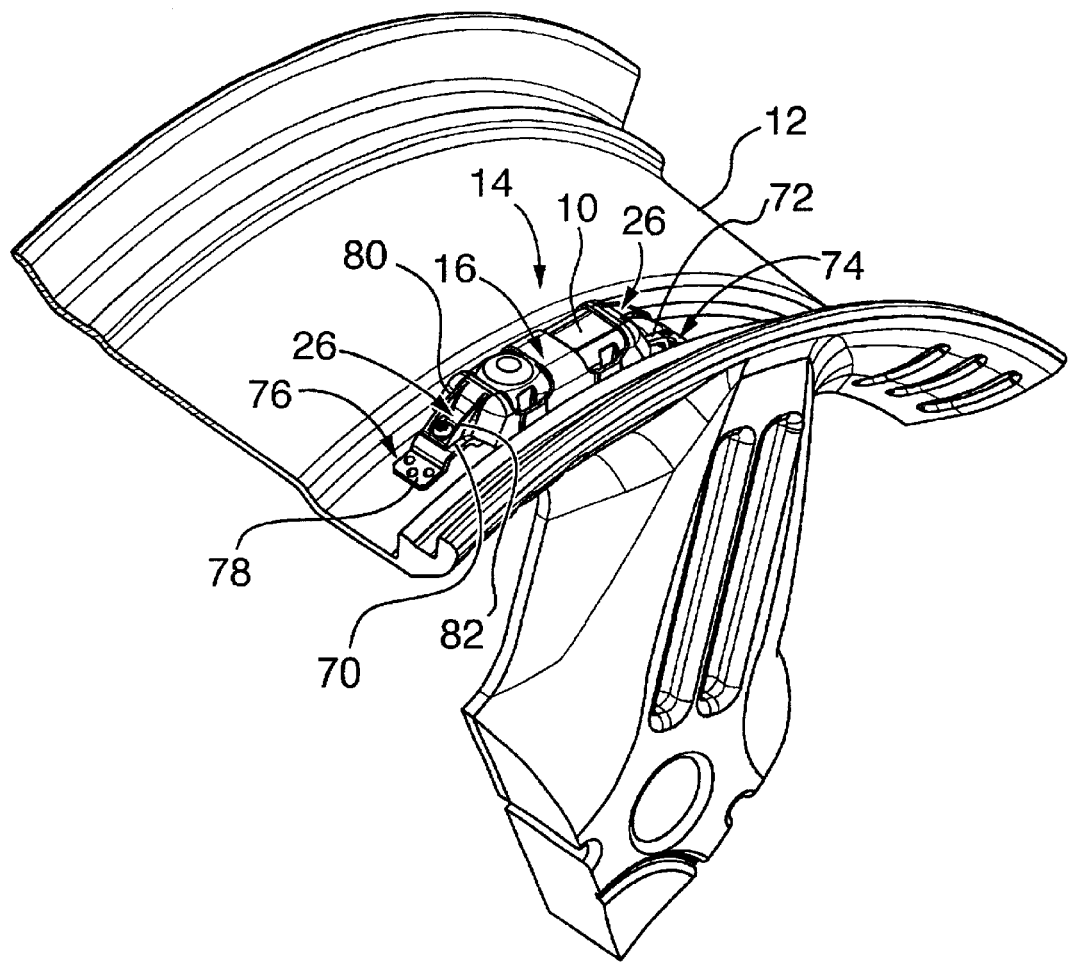
FIG. 1 is a fragmented perspective view of a wheel rim to which an apparatus according to a first embodiment of the invention is connected.
Figure 2:
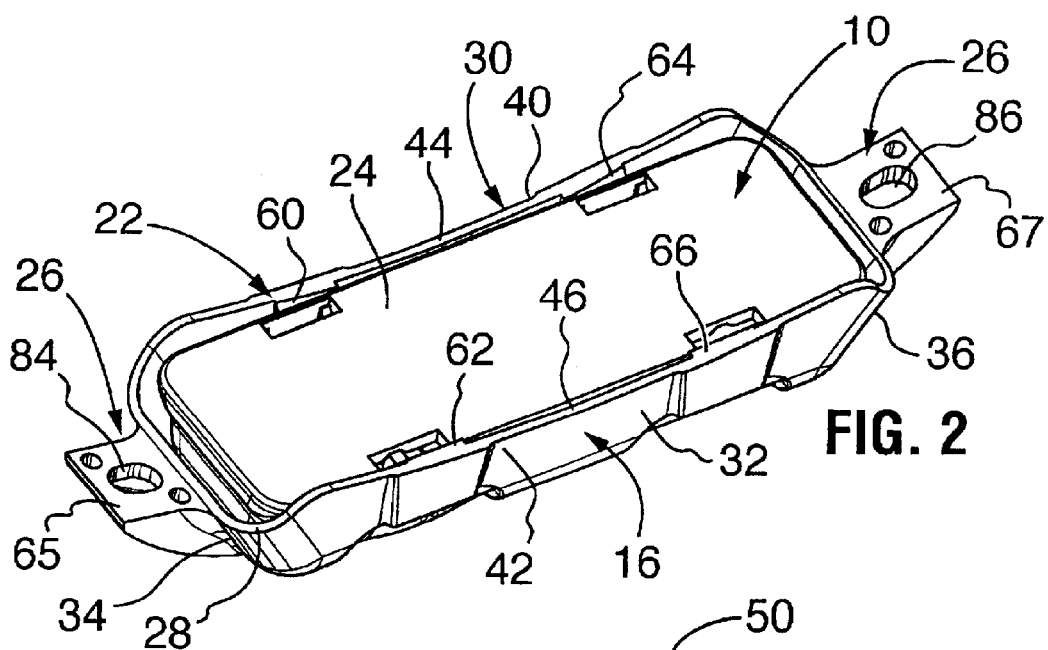
FIG. 2 is a bottom perspective view of the apparatus shown in FIG. 1.

Referring to FIG. 1, an apparatus for mounting a tire condition sensor capsule 10 to a wheel rim 12 is shown generally at 14. The apparatus 14 comprises a housing 16 having a receptacle complementary to the sensor capsule 10 to receive the sensor capsule therein. Referring to FIG. 2, a lock, shown generally at 22 is provided on the housing 16 to cooperate with a cover 24 of the sensor capsule 10 to lock the housing to the sensor capsule. Referring to FIGS. 1 and 2 a connector 26 is also provided on the housing 16 for connecting the housing to the wheel rim 12 such that the sensor capsule 10 is between a portion of the wheel rim and the receptacle.

The tire condition sensor capsule 10 may be of the type that houses electronic circuits including a sensor circuit and transmitter circuit, for example, for measuring and transmitting a signal indicative of air pressure and/or temperature inside the space formed between the wheel rim 12 and a tire (not shown) fitted to the wheel rim. Such sensor capsules 10 can be made in mass quantities and may have a modular shape for interchangeability. The modular shape permits all electronics and sensors to be located within the sensor capsule so there are no extraneous protrusions or projections that may be susceptible to damage during tire installation, for example.

Figure 3:
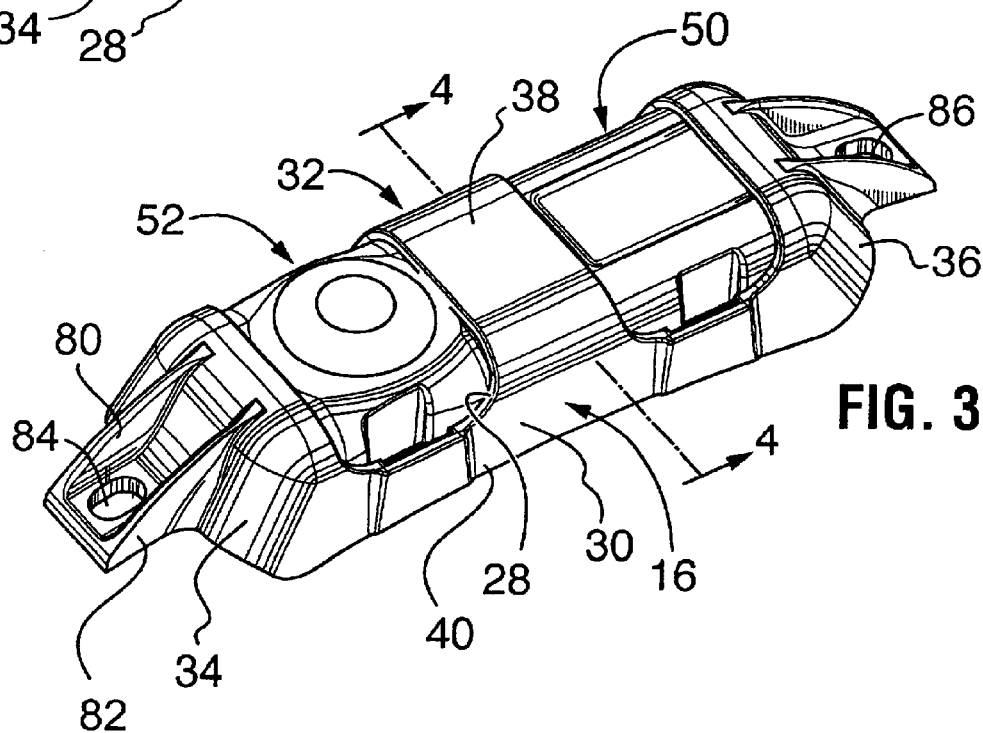
FIG. 3 is a top perspective view of the apparatus shown in FIG. 1.

Referring to FIGS. 2 and 3, in this embodiment the housing 16 is formed by injection molding of plastic to form a relatively rigid structure having a relatively thin sheet-like wall 28 formed to have first and second spaced apart opposite side portions 30 and 32 and first and second opposite spaced apart end portions 34 and 36 connected together by an intermediate portion 38. These portions of the wall 28 define the receptacle in which the sensor capsule 10 is received as seen best in FIG. 2. The sensor capsule 10 is thus received between the first and second spaced apart opposite side portions 30 and 32 and the first and second opposite spaced apart end portions 34 and 36 of the wall 28.

In this embodiment, the first and second side portions 30 and 32 have generally the same width and thus extend away from the intermediate portion 38 by approximately the same distance. The first and second side portions 30 and 32 have first and second edge extremities 40 and 42 respectively which are terminated in first and second parallel contact surfaces 44 and 46 respectively, for contacting the wheel rim 12 when the housing 16 is installed as shown in FIG. 1. In this embodiment, the first and second contact surfaces 44 and 46 are concaved to have a shape complementary to the portion of the wheel rim 12 on which the housing 16 and sensor capsule 10 will be installed. The housing 16 may be installed on a drop center of the wheel rim 12, for example, away from tire mounting flanges so as not to interfere with tire mounting operations. Depending on the diameter of the wheel rim 12 on which the housing 16 will be installed, an arc of the first and second contact surfaces 44 and 46 may have a radius of between about 6 inches to about 36 inches, for example. For a 17 inch wheel rim, the contact surfaces may have a radius of about 7 inches, for example.

Referring to FIG. 3, in this embodiment, the housing 16 is formed to have a relatively smooth contour with no protruding projections or sharp corners that may come into contact with the tire during installation. Also, for weight reduction, the housing 16 has a weight reducing void therein and in the embodiment shown the weight reducing void includes first and second spaced apart weight reducing voids 50 and 52 in the intermediate portion 38. These weight reducing voids 50 and 52 are simply areas in the wall 28 that are open. This reduces the weight of the housing 16, thus reducing its effect on the balance of the wheel rim 12.

Figure 4:
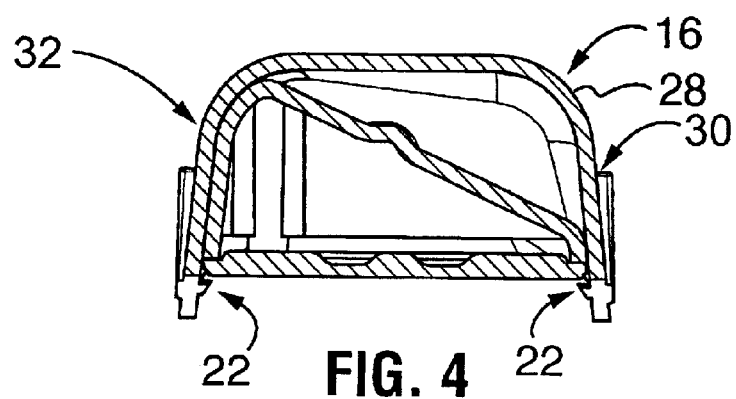
FIG. 4 is a cross sectional view of the apparatus taken along lines 4—4 in FIG. 3.

Referring to FIG. 4, the lock 22 on the housing is shown in greater detail. Desirably, the lock is on the wall 28 and more desirably on at least one of the first and second side portions 30 and 32 and more desirably, both. Referring to FIG. 2, in this embodiment, the lock includes first, second, third and fourth clips 60, 62, 64 and 66. The first and third clips 60 and 64 are formed at the edge extremity 40 of the first side portion 30 and the second and fourth clips 62 and 66 are formed at the edge extremity 42 of the second side portion 32. Referring to FIGS. 2 and 4, the clips 60, 62, 64 and 66 are operable to cooperate and engage with a bottom edge and bottom planar surface of the sensor capsule 10 to lock the housing 16 to the sensor capsule.

In the embodiment shown in FIGS. 1–4, the connector 26 for connecting the housing 16 to the wheel rim 12, includes first and second mounting flanges 65 and 67 formed in the first and second end portions 34 and 36 of the housing respectively. This type of connector 26 is for use in conjunction with mounting seats 70 and 72 already installed or formed on the wheel rim 12. In this embodiment, the mounting seats 70 and 72 include first and second bent metal tabs 74 and 76 having portions that act as the mounting seats and wheel rim mounting portions, one of which is exemplified by item 78, which are mounted to the wheel rim 12. These wheel rim mounting portions (78) may be mounted to the wheel rim 12 by bonding, welding or rivets, for example. Generally, the bent metal tabs 74 and 76 are mounted in spaced apart relation along the drop center of the wheel rim 12 at a spacing suitable to permit alignment of the first and second mounting flanges 65 and 67 on the housing 16 with the mounting seats 70 and 72.

In this embodiment, the first and second mounting flanges 65 and 67 generally follow the contour of the contact surfaces 44 and 46 of the first and second side portions 32 and 34 and thus follow the contour of the drop center of the wheel rim 12. Each mounting flange 65 and 67 has reinforcing members, two of which are shown in FIG. 1 at 80 and 82 and each mounting flange has a respective fastener receiver opening 84 and 86 seen best in FIG. 2, operable to receive a fastener as shown in FIG. 1, such as a rivet or screw to secure it to its corresponding mounting seat such that the sensor capsule 10 is held between a portion of the wheel rim 12 and the receptacle.

Figure 5:
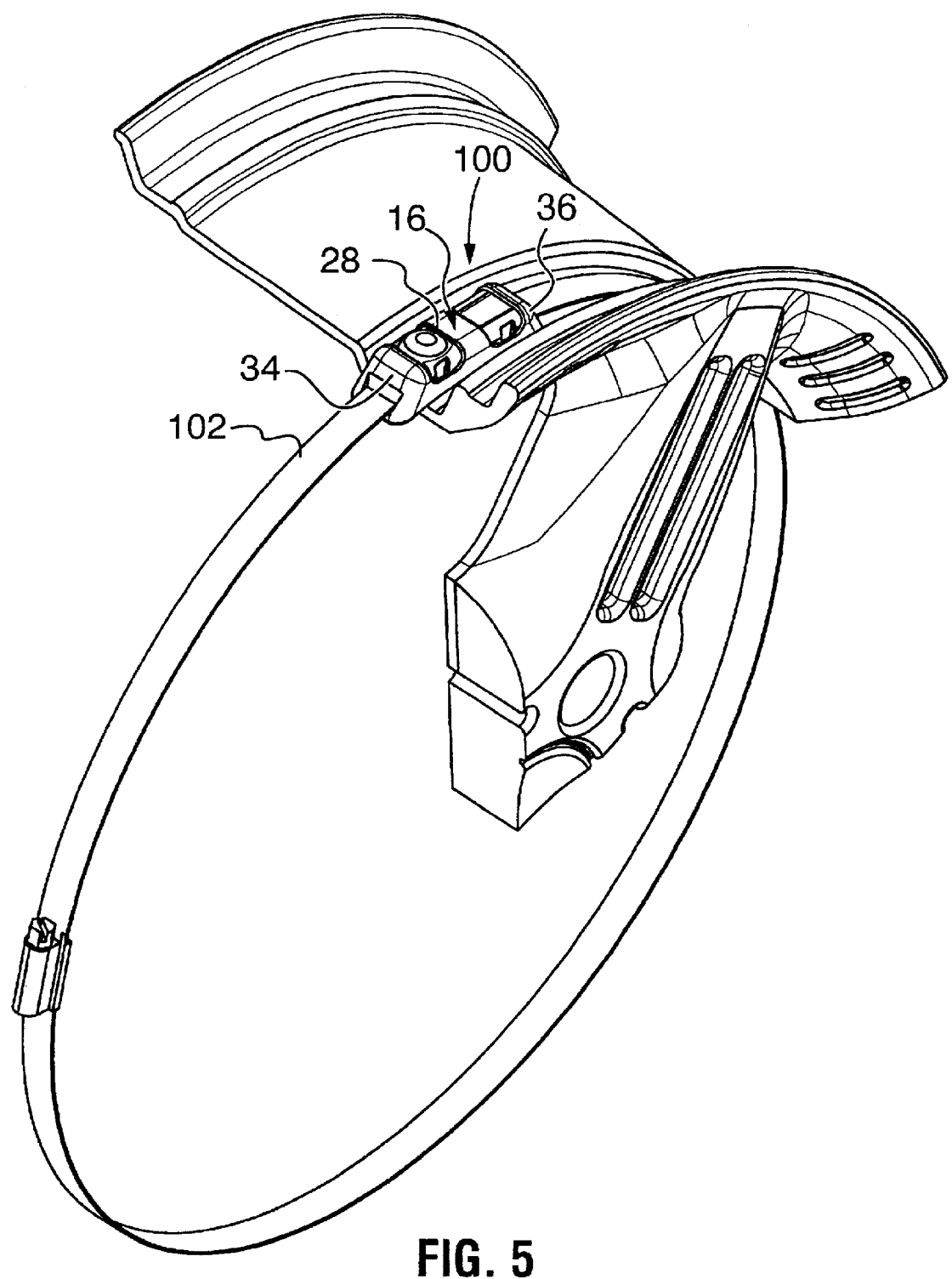
FIG. 5 is a fragmented perspective view of a wheel rim on which an apparatus according to a second embodiment of the invention is connected.
Figure 6:
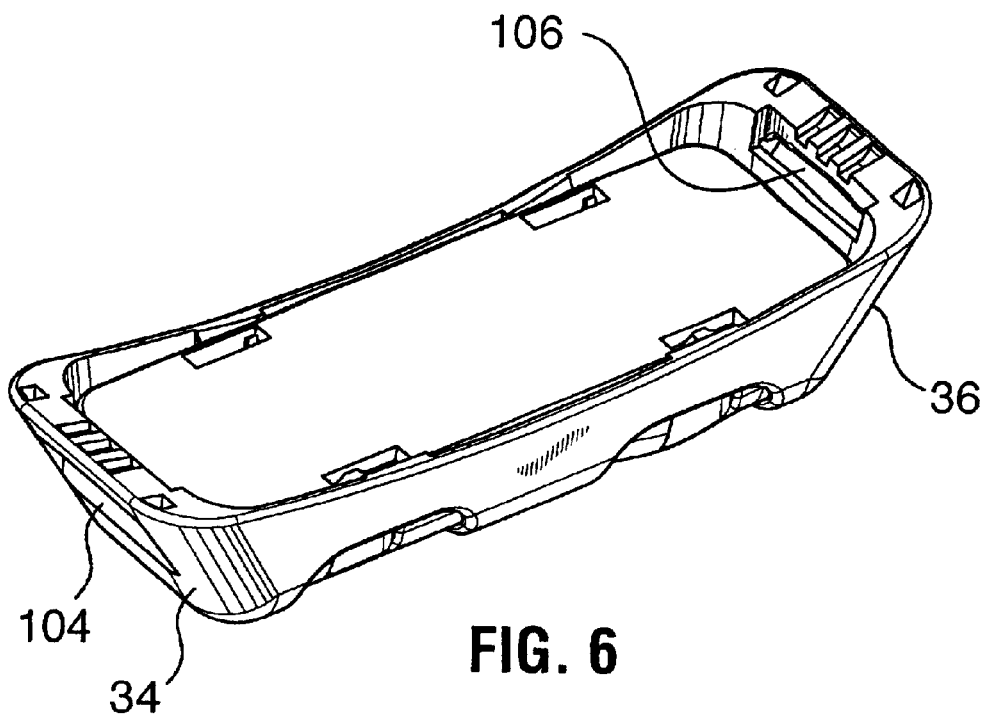
FIG. 6 is a bottom perspective view of the apparatus shown in FIG. 5.

Referring to FIGS. 5 and 6 an apparatus according to a second embodiment of the invention is shown generally at 100. The apparatus 100 is similar to the apparatus 14 according to the first embodiment with the exception that the first and second end portions 34 and 36 of the wall 28 cooperate to act as a strap holder operable to cooperate with a strap 102 that extends around the wheel rim to secure the housing 16 to the wheel rim. To do this, the first and second end portions 34 and 36 are formed with first and second openings 104 and 106 respectively, which in this embodiment are horizontally oriented slots for receiving the strap 102 therethrough. The strap 102 may be a large diameter hose-type clamp, for example.

Figure 7:
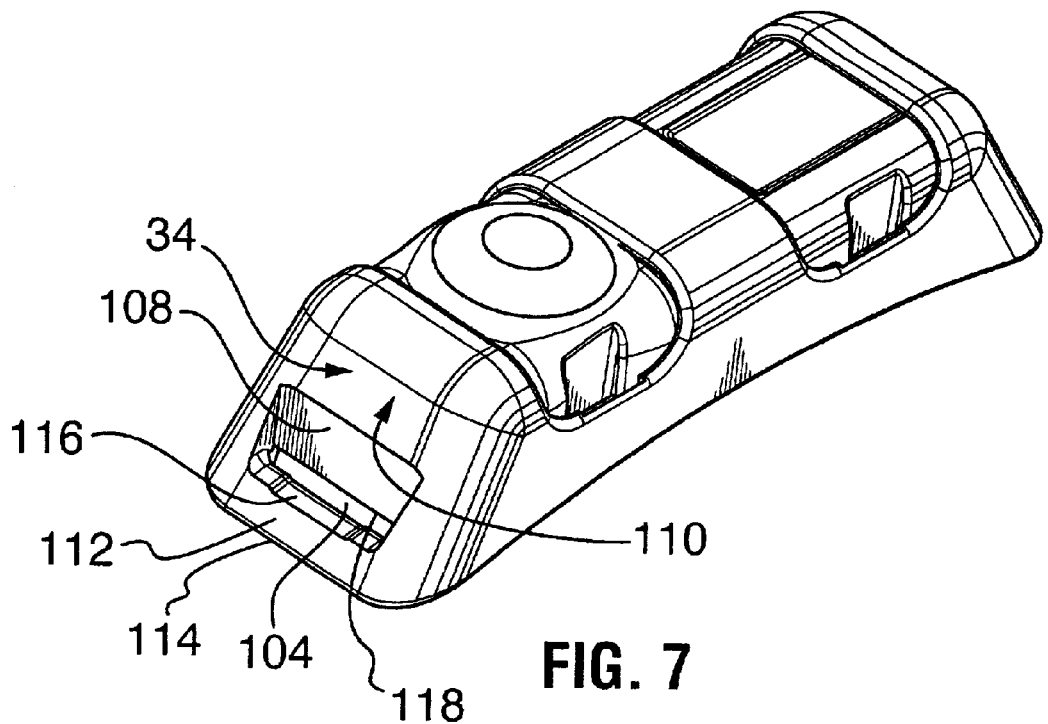
FIG. 7 is a top perspective view of the apparatus shown in FIG. 5.

In this embodiment, to define the openings 104 and 106, the first and second end portions 34 and 36 have respective flat wall portions, only one of which is shown at 108 in FIG. 7, that extend at an angle inwardly of an outer surface 110 of the respective end portion (in this case the first end portion 34). A lower wall portion 112 extends upwardly from an edge extremity 114 of the end portion, following the contour of the end portion 34 and terminates in a recessed edge 116 spaced apart from a facing edge 118 of the flat wall portion 108. The recessed edge 116 allows for easy insertion of an end of the strap 102 into the slot formed between the recessed edge 116 and the facing edge 118, during installation.

Figure 8:
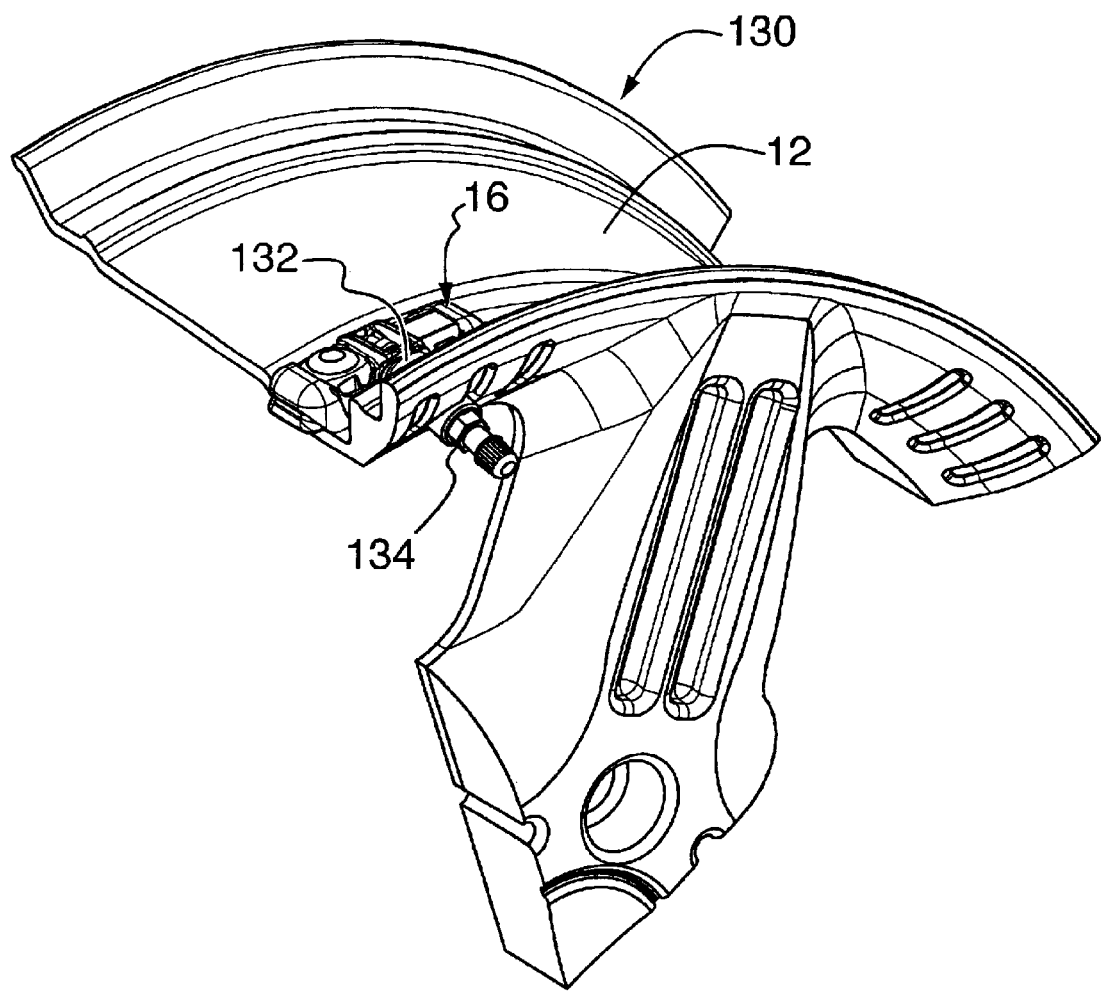
FIG. 8 is a fragmented perspective view of a wheel rim on which an apparatus according to a third embodiment of the invention is connected.

Referring to FIG. 8 an apparatus according to a third embodiment of the invention is shown generally at 130. This apparatus is similar to the apparatus of the first and second embodiments with the exception that the connector for connecting the housing 16 to the wheel rim 12 includes a valve stem connector 132 operable to cooperate with a valve stem 134 of the wheel rim 12 to secure the housing to the wheel rim.

Figure 9:
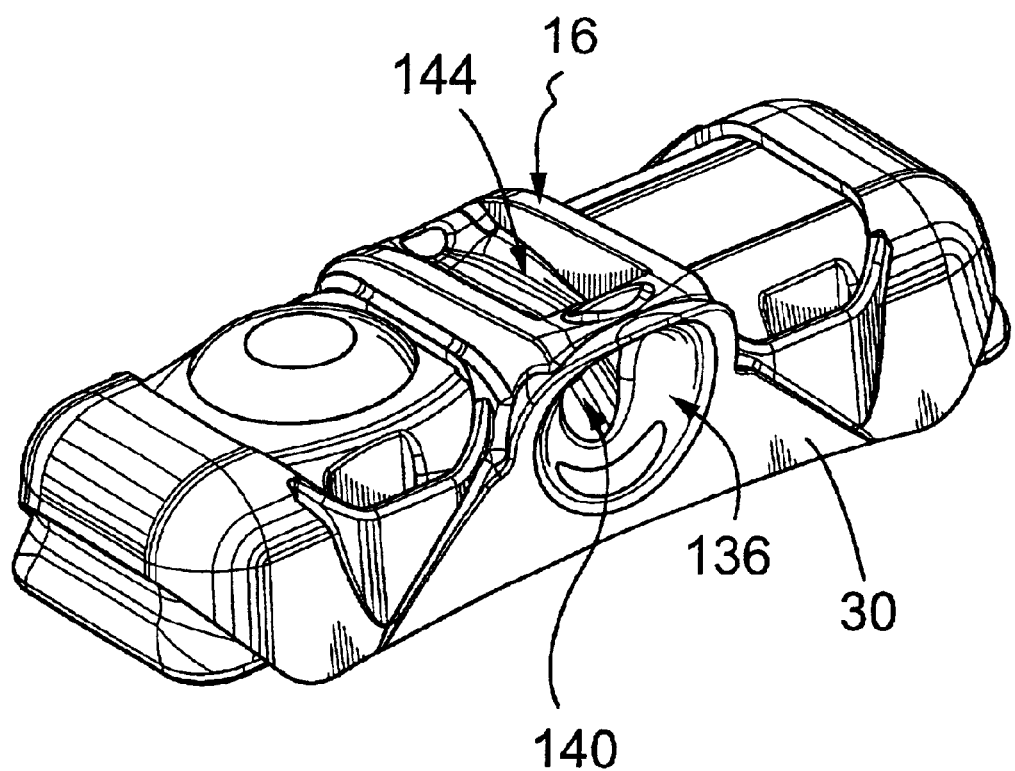
FIG. 9 is a top, perspective view of the apparatus shown in FIG. 8.
Figure 10:
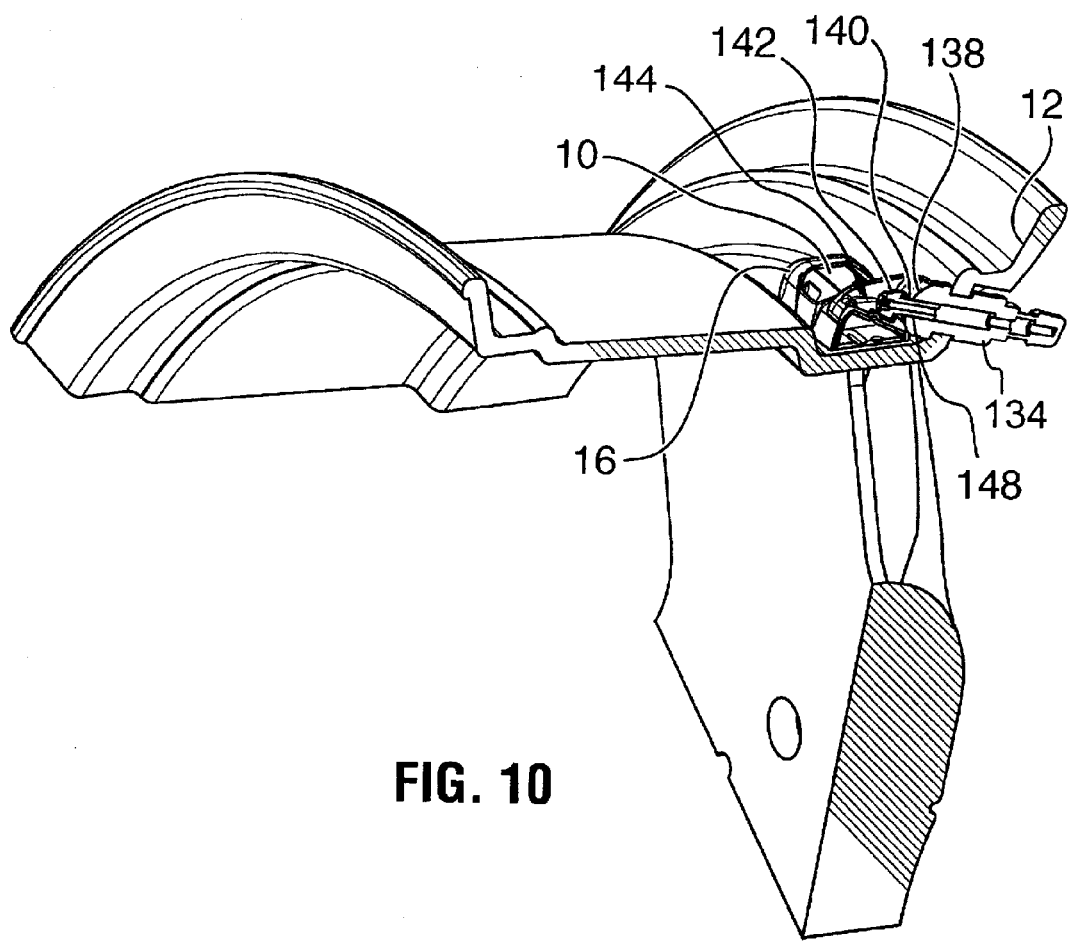
FIG. 10 is a fragmented section/perspective view of the wheel rim and apparatus shown in FIG. 8.
Figure 11:
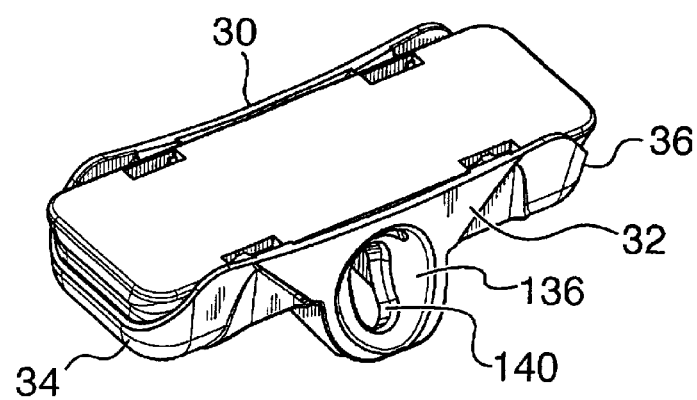
FIG. 11 is a bottom, perspective view of the apparatus shown in FIG. 8.

Referring to FIGS. 9 and 10, the valve stem connector 132 includes a valve stem receptacle 136 in the first side portion 30 of the housing 16 for receiving a portion of the valve stem 134. In particular, the valve stem receptacle is operable to receive a butt end 138 of the valve stem 134 used to admit and release air from a tire mounted to the wheel rim 12. Referring to FIGS. 9, 10 and 11 the valve stem connector further comprises an opening 140 in the housing 16, in communication with the valve stem receptacle 136, for receiving a fastener 142 operable to fasten the valve stem 134 in the valve stem receptacle 136.

A top portion of the intermediate portion 38 of the wall 28 forming the housing 16 is shaped to form a recess 144 providing access to an opening coterminous with the opening 140 into which the fastener 142 may be inserted to extend through the opening 140 and into a threaded opening 148 in the butt end 138 of the valve stem 134. The opening 140 and recess 144 thus enable the fastener 142 to be used to secure the butt end 138 of the valve stem 134 to the housing 16. The valve stem 134 may then be secured to the wheel rim 12, using conventional methods, as shown in FIG. 10, whereby the housing 16 and capsule 10 held thereby is secured to the wheel rim.

Referring to FIGS. 8, 9 and 11 in this embodiment, the end portions 34 and 36 are shorter than the side portions 30 and 32, to reduce weight and material usage since these portions are not used in connecting the housing 16 to the wheel rim 12 in this embodiment.

The lock for locking the housing 16 to the capsule 10 is the same as in the previously described embodiments.

In operation of the apparatus described herein, on being presented with a wheel rim 12 of a particular type, an installer may select from a plurality of housings 16 (such as the three housing configurations shown and described herein), a housing suitable for the particular type of wheel rim on which the capsule 10 is to be installed. Referring to FIG. 3, on selecting an appropriate housing 16, the installer may then insert the capsule 10 into the receptacle in the selected housing such that the clips 60, 62, 64 and 66 snap onto the under surface of the capsule, thereby locking the capsule in the receptacle to form a single unit comprised of the capsule and housing locked thereto. The capsule 10 is thus received and locked in the receptacle.

Then, the appropriate connecting arrangement for the housing 16 selected may be employed. Referring to FIG. 1, to connect a housing 16 according to the first embodiment described herein to the wheel rim 12 the installer positions the housing 16 over the mounting seats 70 and 72 to align the openings in the flanges with the mounting seats and inserts a rivet, for example and then draws the rivet tight to secure the housing to the wheel rim such that the capsule 10 is positioned between the receptacle and the wheel rim. A tire may then be installed on the wheel rim 12 and then the wheel rim may be installed on a vehicle.

Referring to FIGS. 5 and 6, to connect a housing 16 according to the second embodiment described herein, after the capsule 10 is received and locked in the receptacle as described above, the installer inserts an end portion of a strap 102 through the opening 104 in the first end portion 34, passes it under the capsule and then through the opening 106 in the second end portion 36 such that the strap is captured by the openings in the housing. The strap 102 is then wrapped around the circumference of the drop center of the wheel rim 12 and opposite ends of the strap are secured together using conventional methods. A tire may then be installed on the wheel rim 12 and then the wheel rim may be installed on a vehicle.

Referring to FIGS. 9 and 10, to connect a housing 16 according to the third embodiment described herein, after the capsule 10 is inserted and locked in the receptacle as described above the installer then inserts a fastener 142 into the recess 144 to extend through the opening 140 to protrude from the valve stem receptacle 136 and then screws the fastener into the butt end 138 of the valve stem 134 until the butt end is drawn into the valve stem receptacle. Then, the valve stem 134 is inserted through an opening in the wheel rim 12 and is secured thereto using conventional securing methods. The housing 16 is thus secured to the wheel rim 12 through the valve stem 134. A tire may then be installed on the wheel rim 12 and then the wheel rim may be installed on a vehicle.

The above described embodiments provide a versatile apparatus for mounting a tire condition sensor capsule to a wheel rim. As the tire condition sensor capsule entirely encapsulates the sensor and transmitter circuitry, the capsule may be treated as a separate, modular, replaceable unit. By using the housing described herein to secure the capsule to the wheel rim, i.e. not directly connecting the capsule to the wheel rim, expensive capsules can be replaced more easily without damage, enabling them to be removed, repaired and re-installed if desired. The housing may be damaged, even deliberately, to enable the capsule to be removed and a new inexpensive housing may used to re-install the old capsule to the wheel rim. In effect, since the capsules are modular, any housing of the type described herein may be used. Thus an inventory of various inexpensive housings may be made available to provide for mounting the same type of capsules in various ways, such as the ways described herein. An inventory of a plurality of different capsule shapes, sizes and configurations need not be maintained.

While specific embodiments of the invention have been described and illustrated, such embodiments should be considered illustrative of the invention only and not as limiting the invention as construed in accordance with the accompanying claims.

What is claimed is:

1. An apparatus for mounting a tire condition sensor capsule to a wheel rim, the apparatus comprising:
 a housing having a wall defining a receptacle having a shape complementary to the capsule to receive the capsule snugly therein, said wall having first and second spaced apart side portions between which the capsule is received, and wherein said wall has an intermediate portion extending between said first and second side portions;
 a lock on said housing, cooperating with a surface on the capsule to lock said housing to the capsule; and
 a connector for connecting said housing to the wheel rim such that the capsule is between a portion of the wheel rim and said receptacle.

2. The apparatus of claim 1 wherein said lock is on said wall.

3. The apparatus of claim 1 wherein said lock is on at least one of said first and second side portions.

4. The apparatus of claim 1 wherein said lock includes first and second clips on said first and second side portions respectively.

5. The apparatus of claim 1 wherein said first and second side portions have first and second edge extremities respectively.

6. The apparatus of claim 5 wherein said lock includes first and second clips on said first and second edge extremities respectively, said first and second clips being operable to cooperate with the capsule to lock said housing to the capsule.

7. The apparatus of claim 6 wherein said lock further includes third and fourth clips spaced apart from said first and second clips respectively, on said first and second edge extremities.

8. The apparatus of claim 1 wherein said wall has a weight reducing void therein.

9. The apparatus of claim 1 wherein said intermediate portion has a weight reducing void therein.

10. The apparatus of claim 1 wherein said intermediate portion has first and second spaced apart weight reducing voids therein.

11. The apparatus of claim 1 wherein said wall includes first and second end portions extending from said intermediate portion, the capsule being received between said first and second side portions and said first and second opposite end portions.

12. The apparatus of claim 11 wherein said first and second wall portions are wider than said first and second end portions such that said first and second end side portions completely cover respective side portions of the capsule and such that said first and second end portions only partially cover respective end portions of the capsule.

13. The apparatus of claim 11 wherein said connector includes first and second fastener receivers molded into said first and second end portions of said housing.

14. The apparatus of claim 1 wherein said wall has first and second side portions having first and second edge extremities respectively, said first and second edge extremities having first and second contact surfaces respectively for contacting the wheel rim.

15. The apparatus of claim 14 wherein said contact surfaces have a concave shape complementary to the shape of the wheel rim.

16. The apparatus of claim 1 wherein said housing is rigid.

17. The apparatus of claim 1 wherein said housing is formed of injection molded plastic.

18. The apparatus of claim 1 wherein said connector includes first and second fastener receivers on first and second end portions of said housing.

19. The apparatus of claim 1 wherein said connector includes a valve stem connector operable to cooperate with a valve stem of the wheel to secure said housing to the wheel rim.

20. The apparatus of claim 19 wherein said valve stem connector comprises a valve stem receptacle in said housing for receiving a portion of the valve stem.

21. The apparatus of claim 20 wherein said connector further comprises an opening in said housing, in communication with said valve stem receptacle, for receiving a fastener operable to fasten said valve stem in said valve stem receptacle.

22. The apparatus of claim 1 wherein said connector comprises a strap holder operable to cooperate with a strap that extends around the wheel to secure said housing to the wheel.

23. The apparatus of claim 22 wherein said housing is formed of injection molded plastic.

24. The apparatus of claim 23 wherein said strap holder is formed in said housing.

25. The apparatus of claim 24 wherein said strap holder includes first and second slots formed in said housing, said slots being operable to receive the strap.

26. The apparatus of claim 22 wherein said wall has first and second opposite end portions, said strap holder comprising first and second openings in said first and second end portions respectively, for receiving the strap.

27. A method for mounting a tire condition sensor capsule to a wheel rim, the method comprising:
  receiving the capsule between first and second side portions and first and second end portions of a wall of a housing having a receptacle having a shape complementary to the capsule;
  locking the capsule in said housing; and
  connecting said housing to the wheel rim such that the capsule is between a portion of the wheel rim and said receptacle.

28. The method of claim 27 wherein locking comprises engaging a clip on said housing with a surface on the capsule.

29. The method of claim 27 wherein connecting said housing to the wheel rim comprises fastening first and second end portions of said housing to corresponding mounting surfaces on the wheel rim.

30. The method of claim 27 wherein connecting said housing to the wheel rim comprises receiving a portion of a valve stem of the wheel rim in said receptacle in said housing.

31. The method of claim 30 wherein connecting said housing to the wheel rim comprises fastening said portion of a valve stem of the wheel rim in said receptacle in said housing.

32. The method of claim 27 wherein connecting said housing to the wheel rim comprises engaging a strap extending around the wheel rim with openings in said housing.

33. An apparatus for mounting a tire condition sensor capsule to a wheel rim, the apparatus comprising:
  means for holding and protecting the capsule, said means including a receptacle for receiving the capsule;
  means for locking the capsule in said means for holding and protecting; and
  means for connecting said means for holding and protecting to the wheel rim such that the capsule is between said means for holding and protecting and the wheel rim.

34. The apparatus of claim 33 wherein said means for locking comprises a clip on the means for holding and protecting, said clip being operable to engage a surface of the capsule.

35. The apparatus of claim 33 wherein said connecting means includes first and second fastener receivers on said means for holding and protecting.

36. The apparatus of claim 33 wherein said connecting means includes a valve stem connector operable to cooperate with a valve stem of the wheel to secure said means for holding and protecting to the wheel rim.

37. The apparatus of claim 33 wherein said connecting means comprises a strap holder operable to cooperate with a strap that extends around the wheel to secure said means for holding and protecting to the wheel rim.

38. The apparatus of claim 33 wherein said means for holding and protecting comprises a housing having a receptacle for receiving the capsule.

* * * * *